(No Model.)  4 Sheets—Sheet 1.

F. A. RATHBUN.
WHEELED SCRAPER.

No. 499,038. Patented June 6, 1893.

Witnesses
Geo. W. Young.
Jno. L. Condron.

Inventor
Frank A. Rathbun
By H. G. Underwood
Attorney (No Model.) 4 Sheets—Sheet 3.

F. A. RATHBUN.
WHEELED SCRAPER.

No. 499,038. Patented June 6, 1893.

Witnesses
Geo. W. Young.
Jno. L. Condon

Inventor
Frank A. Rathbun
By H. G. Underwood
Attorney (No Model.) 4 Sheets—Sheet 4.

F. A. RATHBUN.
WHEELED SCRAPER.

No. 499,038. Patented June 6, 1893.

Fig. 8. Fig. 9. Fig. 10.

Figures 3, 4:
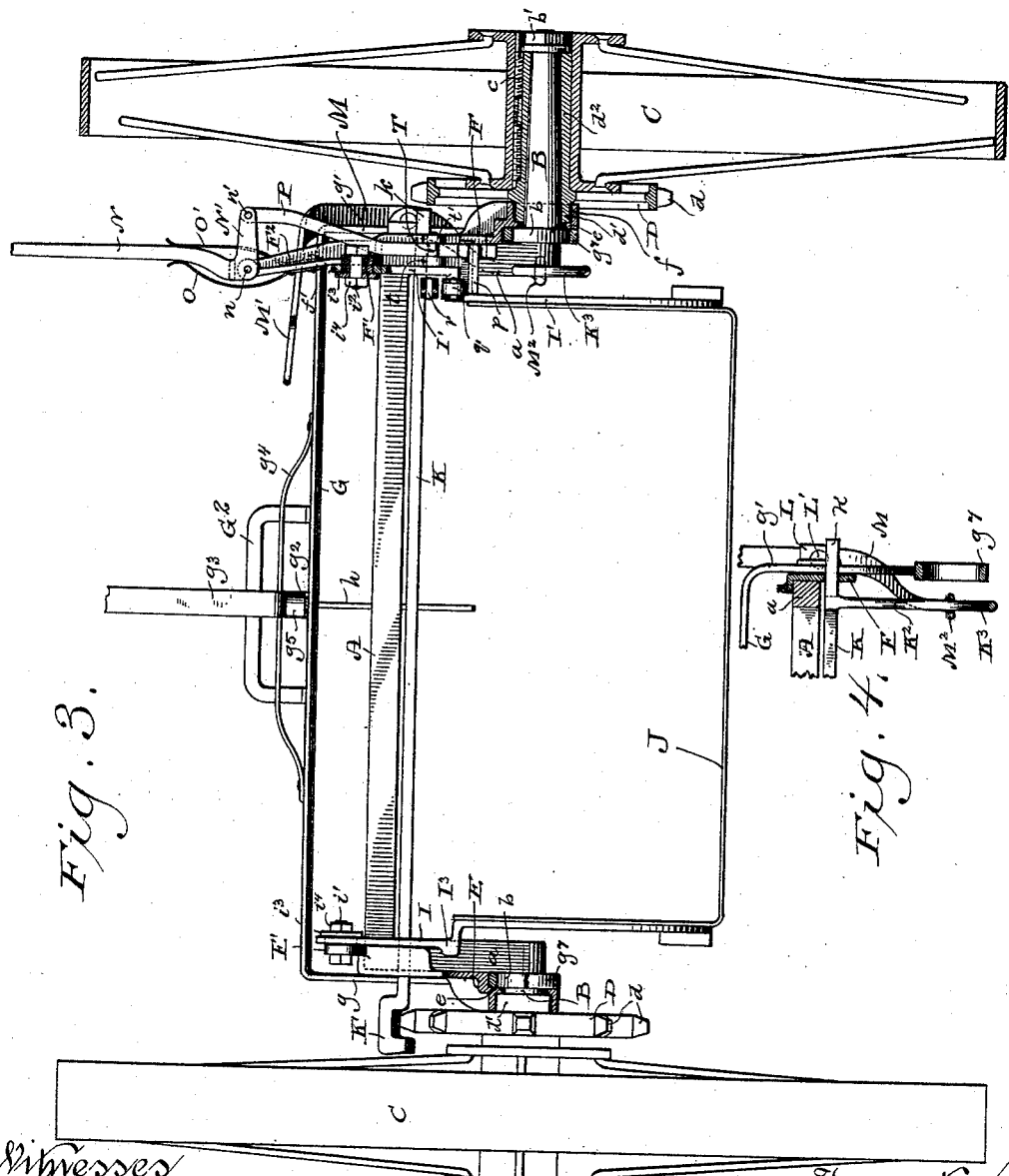

Fig. 4. Fig. 5. Fig. 6.

Witnesses
Geo. W. Young
Jno. L. Condron

Inventor
Frank A. Rathbun
By H. G. Underwood
Attorney

THE NORRIS PETERS CO., PHOTO-LITHO., WASHINGTON, D. C.

UNITED STATES PATENT OFFICE.

FRANK A. RATHBUN, OF SIOUX CITY, IOWA, ASSIGNOR TO THE RATHBUN MANUFACTURING COMPANY, OF SAME PLACE.

WHEELED SCRAPER.

SPECIFICATION forming part of Letters Patent No. 499,038, dated June 6, 1893.

Application filed December 30, 1890. Serial No. 376,247. (No model.)

*To all whom it may concern:*

Be it known that I, FRANK A. RATHBUN, a citizen of the United States, and a resident of Sioux City, in the county of Woodbury, and in the State of Iowa, have invented certain new and useful Improvements in Wheeled Scrapers; and I do hereby declare that the following is a full, clear, and exact description thereof.

My invention relates to wheeled scrapers for leveling land, and for making excavations such as ditches and the like; and my invention consists in certain peculiar and novel features of construction and arrangement, as hereinafter described and pointed out in the appended claims.

In order that my invention may be fully understood, I will proceed to describe it with reference to the accompanying drawings, in which—

Figure 1:
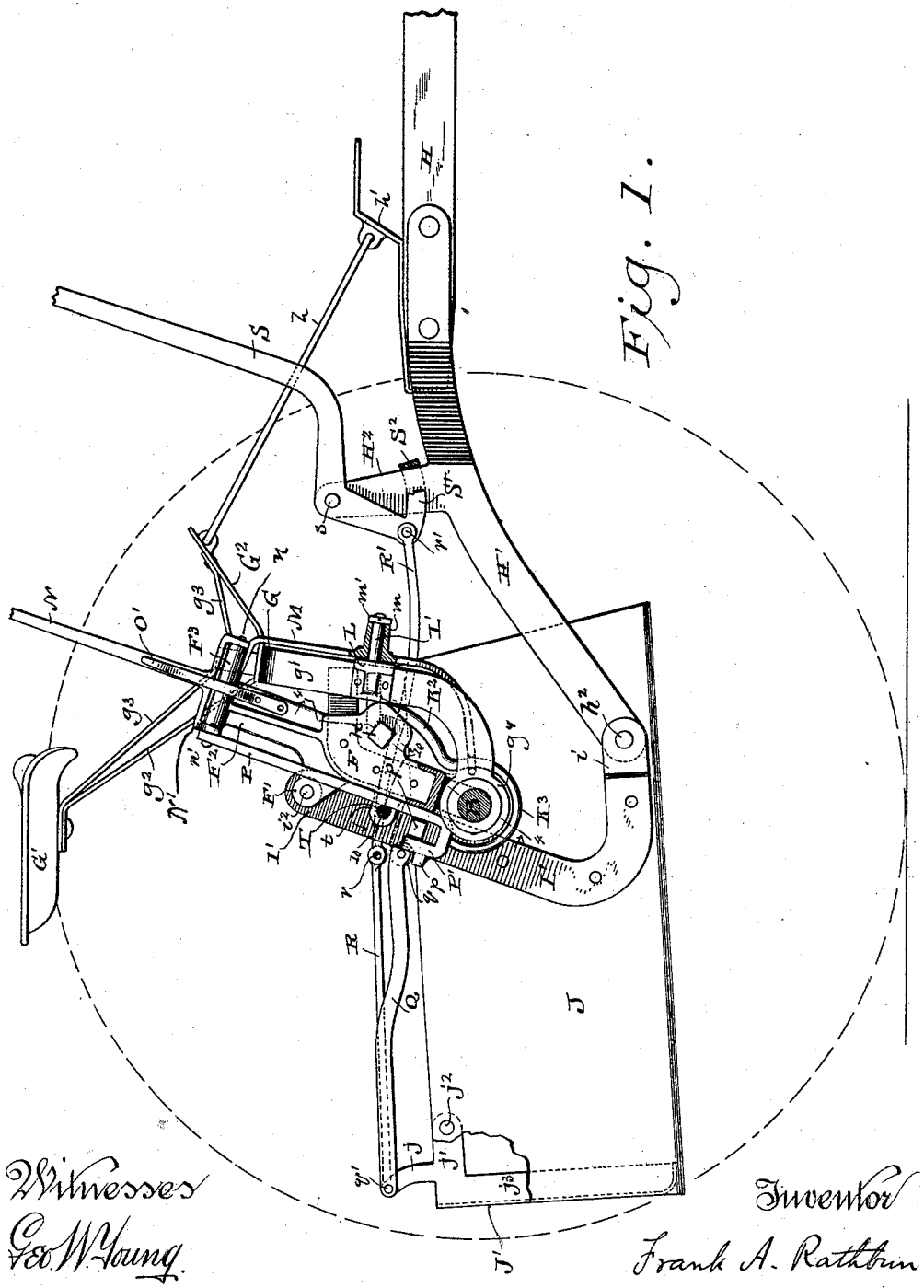
Figure 2:
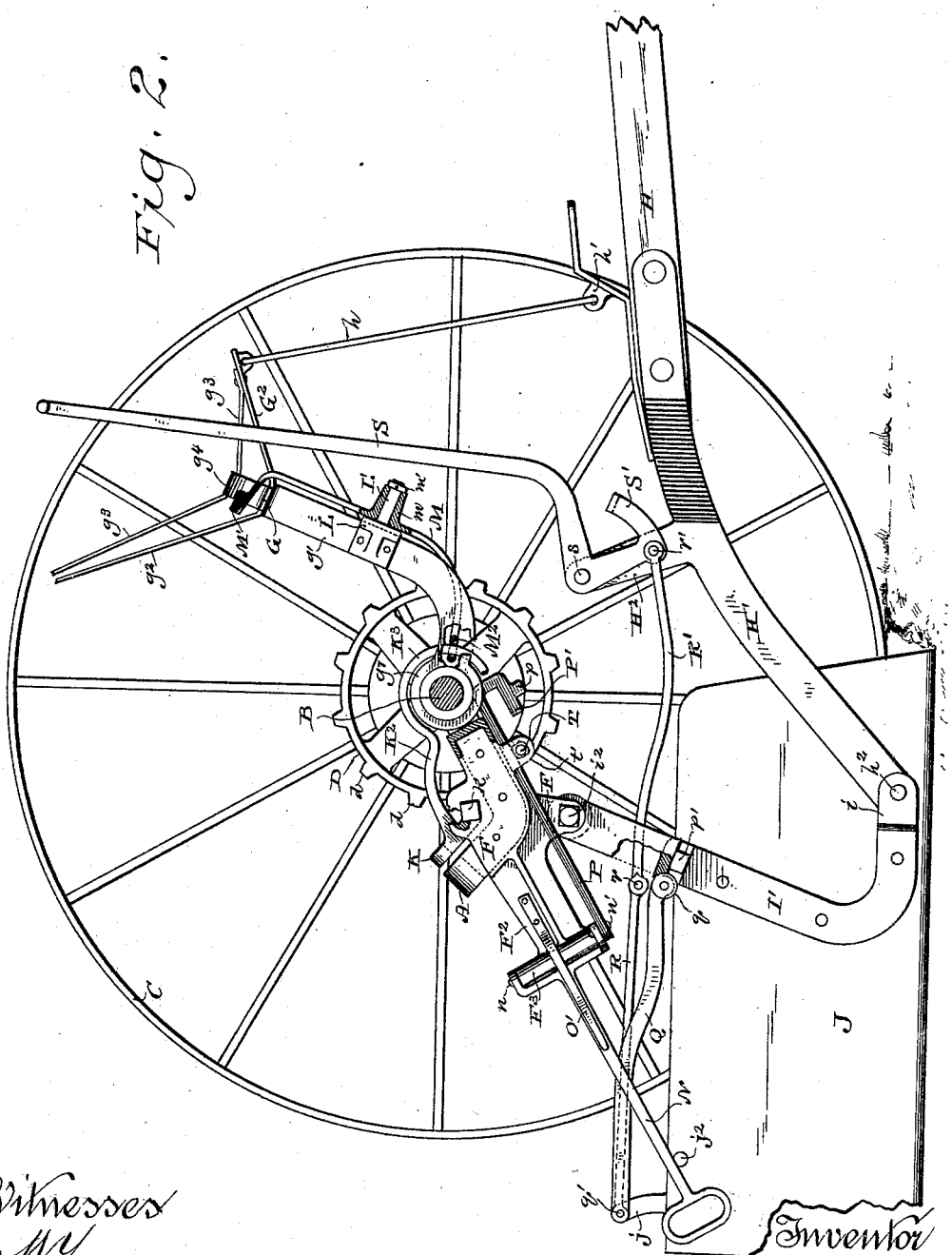

Figure 1 is a side elevation of my improved scraper with its carrying-wheels removed and with the pan in raised position. Fig. 2, is a similar view, the farther carrying wheel being attached, and the pan being lowered to receive the dirt. Fig. 3 is a partly sectional rear elevation of the scraper and both of its carrying wheels, the pan being in raised position as in Fig. 1. Figs. 4 to 10, both inclusive, are detached views of certain parts and details of construction hereinafter described.

The objects of my invention are to simplify and to generally improve the construction of wheeled scrapers of the type embodied in Letters-Patent Nos. 401,658 and 429,387, dated April 16, 1889, and June 3, 1890, respectively, and similar machines, so as to reduce the number of working parts of such scrapers, and thereby make them more durable and less difficult to manipulate. These results I attain by virtue of the construction which I will now proceed to describe.

In the drawings, A designates the cranked axle of the scraper vehicle, which axle is of generally inverted U-shape, and the lower ends of the arms $a$ of which are outwardly extended to form the spindles B B for the two carrying wheels C C.

D D are two raising wheels having teeth $d$ around their peripheries, and hubs $d'$ $d^2$ which fit upon the spindles B, within the hubs of the wheels C; the hubs of the wheels C and D being suitably and rigidly united together as by means of the screws $c$ fitting in screw-threaded bores formed partly in each hub, as shown, or by any other suitable means, so that the wheels C and D may always be rigidly united. The just named hubs of the raising wheels D D comprise inner portions or hub-ends $d'$, and outwardly extending portions $d^2$, these portions being separated by a raised band or collar, all as best shown at the right-hand side of Fig. 3.

E F are two irregular castings bolted to the arms $a$ of the axle A, and the lower ends of these castings terminate in rings $e$ with annular flanges $f$, which latter surround the portions $d'$ of the hubs of the toothed raising wheels D, serving as sand bands, while the rings $e$ abut against the inner ends of said hub-ends $d'$ and against collars $b$ on the spindles B. The ends of the spindles B are screw-threaded to receive nuts $b'$, when the wheels have been adjusted to place.

G is an arch, which extends transversely across the machine, and whose arms $g$ $g'$ are curved at their lower ends, and terminate in rings $g^7$ which loosely encircle the collars $b$ of the spindles B. From about the center of the said arch, there rise rearwardly extending struts or supports $g^2$ $g^3$ for the driver's seat G'. The said arch G may be made of two or more pieces suitably bolted together, or in one piece, as preferred; and, if of one piece, it would have a supplemental arch $g^4$ bolted to it, although if made of two pieces said supplemental arch might be merely the bent up end of one of the pieces, there being, in either case, a post or support $g^5$ between the parts G and $g^4$, a suitable bolt $g^6$ uniting these parts and the struts $g^2$ $g^3$ all together, and the strut $g^3$ being continued forward and united to the foot rest $G^2$ which projects from the arch G, to brace said foot-rest, from which a link $h$ extends to a bracket or hook $h'$ on the vehicle pole H; to each side of which pole bent hounds H' H' are secured, whose other ends are loosely pivoted, as shown at $h^2$ $h^2$, to the offset lower ends $i$ of the curved hangers I I', which, in turn, are rigidly secured to the outer sides of the pan or scraper proper J. The upper ends of these hangers I I' are pivoted, as shown at $i'$ $i^2$, to lugs E' F', projecting from the before named castings E, F, respectively; the said lugs E' F' having hubs $e'$ $f'$, and the hangers I I' having circular openings, at their upper ends to receive said hubs, and there being suitable washers $i^3$ and nuts $i^4$ to keep the parts in place.

K designates the lifting bar, which extends transversely across the machine; parallel, for its greatest length, with the transverse portion of the axle A; and passing through suitable slots in the described castings E, F, as shown in Figs. 7 and 4 respectively the part which passes through the casting E being first curved, as best shown in Fig. 6; and terminating in a square hooked end K' from which there projects a forwardly extending cam-plate $k'$, for engagement, at the proper time, with the adjacent arm $g$ of the arch G; on the other side of which arm is a guard or extension $E^2$ projecting from the casting E. The opposite portion of the lifting bar K is likewise curved, (as shown at K, Fig. 2,) and terminates in a straight lateral projection $k$, passing through a suitable slot in the casting F as shown in Fig. 4; and at about the inner end of this straight portion $k$, there projects from this curved portion of the lifting bar K, a curved bar $K^2$ terminating in an open ring or semi-circular end $K^3$, which normally surrounds (without contact) the lower end of the arm $a$ of the cranked axle A on this side of the machine.

L is a bearing plate bolted to the arm $g'$ of the arch G; and having a pin, stud, or arbor L' projecting therefrom, to receive a perforated boss $m$ on a bent lever M, a collar $m'$ or other analogous device securing these parts in position, so that said lever M may turn upon said pin L'. The upper part of this lever M is bent in to form a treadle M' within reach of the foot of the driver; while the lower part of said lever M terminates in a spanner or oblong ring $M^2$ embracing the lower part of the described curved bar $K^2$.

The casting F is provided with an upward extension $F^2$ terminating in an enlarged and transversely extending hollow end or hub $F^3$.

N is a lever, whose lower end is bifurcated to straddle the described hub $F^3$, to which it is hinged by means of a bolt or journal $n$ passing through said hub $F^3$, and having suitable nuts; one side of the said bifurcated lower end of the lever N, being extended to form an arm N', at an angle to said lever, and to the outer end of this arm N' is pivoted, as shown at $n'$, the upper end of a latch P, the lever N being normally kept in an upright position between two springs O O' whose lower ends are secured to the extension $F^2$ of the casting F. The latch P has a hook-shaped lower end P', from the short arm of which there extends a transverse projection $p$, the hook-shaped end being for engagement, at the proper time, with a lug $p'$ on the hanger I', located just below the line of the bend or offset in said hanger, as best shown in Fig. 8. Both hangers I and I' are offset, as shown in Fig. 3; and the hanger I above its offset is preferably formed with a stop $I^3$.

In line with the projection $p'$ is a rounded recess $p^2$ in the offset of the hanger I', which is designed to receive a roller $q$, pivoted on the forward end of a bent arm Q, whose rear end is pivoted, as shown at $q'$ on a lug $j$, rising from the upper edge of the end gate J' of the pan, which end gate has upper side flanges $j'$ pivoted at $j^2$ to the sides of the pan, and also side and lower flanges $j^3$ $j^4$, which fit inside the rear end of the pan J when the said end-gate J' is closed. From the same pivot $q'$, just named, there extends forward a double link R R' (centrally united as shown at $r$) to a pivotal point $r'$ at the angle of the lower end of the tilting lever S, which lever is pivoted as shown at $s$ to an arm $H^2$ rising from one of the hounds H'; the said lower end of the said lever continuing in an arm S' having a bent end $S^2$, which forms a stop in conjunction with the said arm $H^2$, as hereinafter described.

The casting F has at one side a pair of projecting lugs $t$ $t'$ between which the shank of the latch P travels; said lugs being united by a bolt or pin T, which, being preferably round, and loose in its bearings, forms an anti-friction roller for said latch-shank.

The operation of my improved scraper will be understood from the foregoing description of its construction, in connection with the accompanying drawings. Starting with the machine in the position for use, shown in Fig. 2, let it be understood that it is desired to depress the nose or point of the pan somewhat. It is only necessary for the driver to pull the upper end of the tilting lever S toward him, which draws through the link R' R on the rear of the pan, and elevates the said rear end of the pan, on the fulcrum points $h^2$, the arm Q preventing the end-gate J' of the pan from opening under this strain, and the pan filling simply by the forward movement of the device. To raise the pan, the driver puts his foot on the treadle M', depressing which operates the foot-lever M, the link or spanner $M^2$ of which serves to move the bar $K^2$ and the lifting bar K laterally, so that the ends of said bar, $k$ and K', will be forced over the wheels D D, in the path of the teeth $d$ $d$ on said wheels; so that a forward movement of the vehicle-wheels C (which as stated, are rigid with the lifting wheels D) will serve to at once raise the pan by reason of the engagement of the hooked end K' and straight end $k$ of the lifting bar K, with the teeth $d$ $d$ of the wheels D D to the position shown in Fig. 1, and as the wheels revolve, the arm $g$ of the arch G encounters the cam-plate $k'$ on the adjacent end of the lifting bar K; and said cam forces the said lifting bar ends K' and k out of engagement with the teeth d of the wheels D, into the position shown in Fig. 3; so that now the vehicle may be safely transported without affecting the position of the pan, for, as the pan is raised by the action of the lifting wheels in the manner described, the lug $p'$ on the hanger I' describes a forward movement in the arc of a circle toward the short arm of the hook-end P' of the latch P (which latch is also swinging around into a perpendicular position), until the said lug encounters the end of the said short arm depressing the latch against the force of the spring O', and then slipping past the end into the space within the hook end of the latch P; when said spring O' at once, by pressing against the lever N, raises the said latch again to its normal position, these parts assuming the relative positions shown in Fig. 1, and this effectually locks the pan against any accidental backward displacement. To dump the pan, the lever N is pulled in toward the driver's seat; which raises the latch P until the lug $p'$ on the hanger I' is in contact with the inner side of the bottom of the hook-end P' of said latch, and the projection $p$ on said latch has raised the roller $q$ at the end of the arm Q up out of engagement with the recess $p^2$ in the hanger I', and then the pan dumps by gravity, as its greater weight is back of the axial line of support, the end gate J' of the pan opening in this dumping movement by reason of the jointed link R R', attached to said end gate, being held rigid by the engagement of the end $S^2$ of lever S against the arm $H^2$, as shown in Fig. 1; and, if the pan does not empty freely, the driver has only to pull the lever N backward a little, to facilitate the dumping. To lower the pan into the position shown in Fig. 2, the pan (whether full or empty) is dumped, as just described; and the driver pushes outward on the lever N, which depresses the latch P until its short arm is below the lug $p'$, when the rear end of the pan will drop to the ground, and a forward movement of the vehicle will place the entire pan on the ground, in position for use, as first described.

Having thus described my invention, what I claim as new, and desire to secure by Letters Patent, is—

1. In a wheeled-scraper, the combination with the pan or scoop, and its connections of a cranked axle having spindles at the ends of its arms, carrying-wheels mounted on said spindles and having toothed raising wheels rigidly secured to their inner sides concentric with their hubs, castings secured to the axle arms, and a longitudinally movable lifting-bar extending across the vehicle and having one hooked end, and one straight end, projecting through slots in said castings, for engagement with said raising wheels, substantially as set forth.

2. In a wheeled-scraper, the combination with the pan or scoop, and its connections, and the vehicle frame of a cranked axle having spindles at the ends of its arms, carrying wheels mounted on said spindles and having toothed raising-wheels rigidly secured to their inner sides concentric with their hubs, a longitudinally movable lifting-bar extending across the vehicle parallel, for its greatest length with the transverse portion of the said axle, and having one hooked end and one straight end for engagement with said raising-wheels, an arm extending from said lifting-bar, and a treadle lever pivoted upon the vehicle frame and operatively connected to said extending arm, substantially as set forth.

3. In a wheeled-scraper, the combination with the pole and its attaching hounds, a lever connected to one of said hounds, and having a bent lower end forming a stop, a pan pivotally attached to said hounds and having a pivoted end gate, and a jointed link pivoted to the gate and to the lever, substantially as set forth.

4. In a wheeled-scraper, the combination of a cranked axle having spindles at the ends of its arms, carrying wheels on said spindles, toothed raising wheels rigid with said carrying wheels, castings rigidly secured to the axle arms, hangers pivotally supported from said castings, a pan secured to said hangers, a longitudinally movable lifting bar extending transversely across the vehicle, and through slots in said castings and having one straight and one hooked end, a forwardly projecting cam-plate secured to the hooked end of the said bar, a frame upon which the cam-plate strikes and a treadle lever secured to one of said castings, and connected to said lifting bar, substantially as set forth.

5. In a wheeled-scraper, the combination with a cranked axle having spindles at the ends of its arms, a pair of castings connected to the axle so as to move radially about the said spindles, a pan having hangers at each side pivotally connected to said castings, a lever pivoted upon one of said castings and having a long and a short arm, a latch pivoted to the short arm of the lever and having a hooked lower end, a pin projecting from one of said hangers, adjacent to said latch, and springs on the said casting bearing against the long arm of the said lever, substantially as set forth.

6. In a wheeled scraper, the combination with a cranked axle having spindles at the ends of its arms, a pair of castings connected to the axle so as to move radially about the said spindles, a pan having hangers at each side pivotally connected to said castings, and one of said hangers having a rounded recess, and a projecting pin adjacent thereto, a lever pivoted upon one of said castings and having a long and a short arm, a latch pivoted to the short arm of the lever and having a hooked lower end, springs on the said casting bearing against the long arm of the said lever, an end gate pivoted to the pan, an operating lever pivotally connected to the driving gear and linked to the end gate and an arm also linked to the end gate, and carrying a roller at its free end for engagement with the said hanger recess, substantially as set forth.

In testimony that I claim the foregoing I have hereunto set my hand, at Milwaukee, in the county of Milwaukee and State of Wisconsin, in the presence of two witnesses.

FRANK A. RATHBUN.

Witnesses:
H. G. UNDERWOOD,
WM. KLUG.